Patented July 16, 1929.

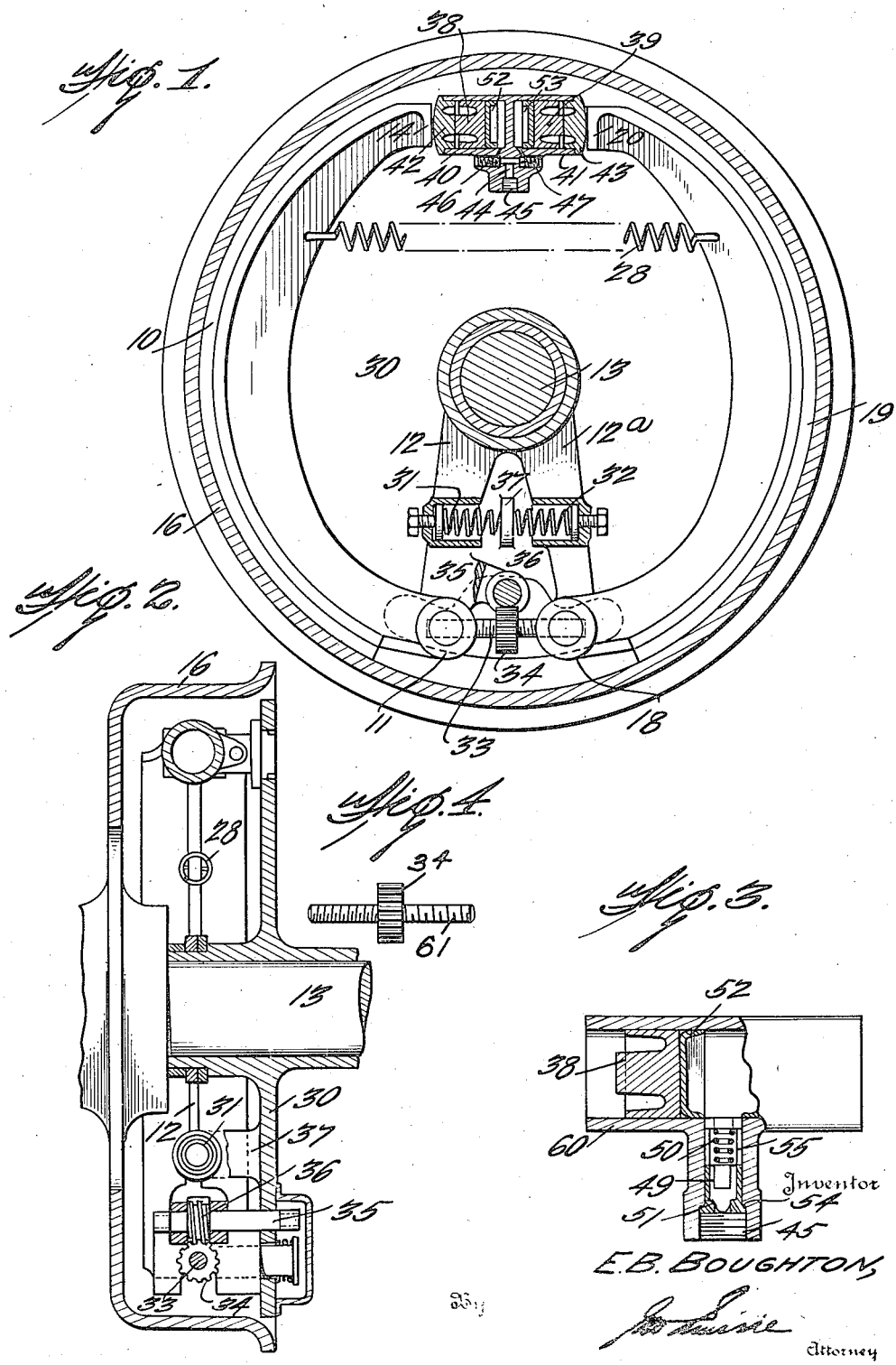

1,721,370

UNITED STATES PATENT OFFICE.

EDWARD BISHOP BOUGHTON, OF LONDON, ENGLAND.

BRAKE FOR USE ON VEHICLES.

Application filed August 16, 1928, Serial No. 300,002, and in Great Britain June 28, 1927.

This invention refers to improvements in brakes for use on vehicles and it has more particular reference to brakes for motor road vehicles of the kind in which a revolving drum is engaged by a pair of shoes or blocks arranged to give a servo action in one or both directions.

The primary object of the present invention is to provide in one arrangement a brake of improved and simplified construction having a pair of shoes arranged as hereinafter described so as to give a decided servo or increased leverage effect in the forward running direction and a braking effect equal to the ordinary type of two shoe brake in the reverse running direction, or arranged to give a servo effect in both directions.

Now according to the present invention in a two shoe servo brake comprising a drum and a pair of expanding shoes I locate the anchoring point or points of the two shoes about which they tend to swing when expanded so that their adjacent or connected ends can move angularly but not appreciably in a radial direction when the brake is applied, movement being outward at their free ends.

In order that the present invention may be clearly understood and readily carried into effect, it is hereinafter described with reference to the accompanying drawings, in which:—

Figure 1 is a sectional elevation illustrating an arrangement for anchoring the ends of the brake shoes and also hydraulic means for expanding the brakes;

Figure 2 is a vertical transverse section corresponding to the preceding figures;

Figure 3 is a detail sectional view illustrating means for automatically adjusting the clearance between the brake shoes and the drum; and Figure 4 is an elevation illustrating a modified form of threaded operator.

As shown and in carrying the present invention into effect one shoe which in the forward running direction acts as the leading or servo shoe is located at its one or lower end in a radius arm conveniently arranged around or carried on the central hub spindle and constrained to have angular movement in one (as shown an anti-clockwise) direction only, the other or upper end of the shoe being operated by means for forcing the said shoe on to the drum. The bracket or radius arm may be arranged so that the locating end turns concentrically about the central hub spindle. The adjacent end of the second or main shoe is likewise located in or on a similar bracket or radius arm as servo shoe and has its other end resting against or being operated on by the same means which operates the servo shoe.

The supported ends 11 and 18 of the two brake shoes 10 and 19 are located in double brackets or radius arms 12 and 12$^a$ able to move circumferentially in either direction but which are centered in the "off" position of the brake by springs 31 and 32 which co-operate with a medial stop 37 on the spider plate 30. The two ends of the double brackets 12 and 12$^a$ are not free but are adjustably connected by a right and left-hand thread 33 carrying a gear wheel 34 which can be operated by a gear wheel 36 the winding spindle 35 of which is accessible from either side of the brake and which when turned in one or other direction will serve to force apart or bring together the two supported points 11 and 18 and the brackets 12 and 12$^a$ equally, or if desired owing to greater wear coming on one shoe of the brake, the gear may be so arranged that the pitch of the screw 33 at one side is greater than that of the other, as shown at 61 in Figure 4, this difference in the pitch being equal to the approximate difference in the rate of wear of the linings of the two shoes 10 and 19.

In order to give an equally increased servo braking effect in both directions the brake shoes 10 and 19 may be expanded by hydraulic means or by compressed gas or fluid, the expanding pistons 38 and 39 in the cylinders 40, 41 being arranged so that these operate in the required direction and stops 42, 43 being provided between the ends 14 and 20 of the shoes 10 and 19 and the cylinders 40, 41 to act as supporting points. Thus the improved two shoe servo brake when operated by hydraulic or gas pressure is arranged in such a manner and provided with springs 28 so that the shoes 10 and 19 are in constant contact with the operating mechanism under all conditions, thereby eliminating play and consequent noise, the brake being arranged to act as a servo brake equally in either direction if desired. Connecting the two cylinders 40, 41 together is a valve controlled passage 44 leading to a common pressure supply conduit 45. In this passage 44, and arranged one to each cylinder 40, 41, is a light spring loaded valve 46, 47 which, when pressure is applied, such as by putting on the brake, opens and allows the liquid or gas to flow freely to the respective cylinders 40, 41, but which is arranged in such a way that the valves offer a resistance to the back flow, or return of the liquid when the brakes are released. This resistance to the back flow can be adjusted to any required amount.

This resistance acts as a cushioning device to the brake as described, where the pressure on one shoe is greater than on the other owing to the servo action tending to displace the liquid or gas in one cylinder and transferring it to the other.

Thus in action when the brakes are applied both shoes 10 and 19 will be expanded equally, and the stops or contact caps 42, 43 in the ends of the cylinders 40, 41 will be pushed outwards giving clearance between the said caps and the cylinder ends. As soon as the shoes 10 and 19 come in contact with the drum 16, they are carried round with the drum and force the liquid or gas out of one cylinder into the other, thereby forcing back one cylinder cap against the cylinder, but owing to the resistance to the free flow of the fluid or gas through the non-return valve, a cushioning device is obtained which allows the said cap to slowly come to a stop against the end of the cylinder without shock or noise. The same method of operation can be arranged mechanically.

Where the brake is operated by fluid or gas pressure the expanding medium may as hereinafter described with reference to Figure 3 be employed for automatically adjusting the clearance between the two shoes 10 and 19 and the drum 16, as wear on the lining of the shoes takes place. To this end there is inserted where desired in the operating fluid column and forming part of such column a solid substance which may take the form of a valve piston 49 arranged so that under pressure, such as when the brake is operated this solid substance is moved a definite predetermined amount before further fluid can enter the cylinder. After a certain predetermined movement the liquid or gas is permitted to flow past this solid substance 49 to fill the cylinder 60 to the required amount to force the brake shoes on hard. As soon, however, as the pressure operating the brake shoes is relieved this solid substance is returned at first by a spring 50 and finally by the return fluid pressure, and at the end of its travel closes a valve 51 thus preventing further displacement of liquid or gas from the cylinder, the amount of fluid being allowed to return being that determined upon as necessary for the amount of movement at the brake shoes 10, 19 to give the required clearance. In one practical arrangement for operating the two shoes 10, 19, two pistons 38, 39 with their respective sealing cups 52, 53 could be mounted back to back in a common cylinder and the solid substance would be inserted in the fluid column 45 leading thereto. The fluid conduit would be provided with a valve seat 54 which co-operates with the solid substance 49 on its return to close same, the spring 50 and fluid return pressure ensuring the return of the solid substance 49 when pressure is relieved. The solid substance 49 would work in a guide 55 having relief channels, the action being such that pressure on the solid substance 49 to operate the brakes forces same upward until the liquid can flow freely past it, through the channels in the guide 55 thereby allowing sufficient liquid to pass to expand the shoes 10 and 19 to the desired amount to bring them hard in contact with the brake drum 16. As soon as pressure is relieved the spring 50 starts to force the solid substance 49 outwards and the pressure created by the springs 29, 29 pulling the brake shoes off, forces down the solid substance 49 to the extreme limit when the valve is entirely sealed and no further liquid can escape.

What I claim is:—

1. In a two-shoe servo brake, supporting means for one end of each of the shoes, said means including an independent radius arm for each shoe, both radius arms having a common center of movement, and springs for centering the arms in the off position of the brake shoes.

2. In a two-shoe servo brake, supporting means for one end of each of the shoes, said means including an independent radius arm for each shoe, both radius arms having a common center of movement, a rod having relatively opposed screw-threaded connections with the ends of the arms connected to the shoes, and means for operating the rod to relatively adjust the arms.

3. In a two-shoe servo brake, supporting means for one end of each of the shoes, said means including an independent radius arm for each shoe, both radius arms having a common center of movement, a rod having threaded terminals cooperating with the ends of the arms connected to the shoes, one such terminal having a right hand thread and the other a left hand thread, means for operating the rod, and means for automatically centering the arms in the off position of the shoes.

4. In a two-shoe servo brake, means for relatively supporting one end of each of the shoes, a fluid actuated mechanism for operating the other end of each of said shoes, said supporting means including an independent radius arm for each shoe, both radius arms having a common center of movement, a rod having threaded terminals cooperating with the ends of the arms connected to the shoes, one such terminal having a right hand thread and the other a left hand thread, and means for operating the rod, said threaded terminals differing in pitch to vary the shoe adjustment to compensate for unequal wear.

In testimony whereof I have hereunto signed my name.

EDWARD BISHOP BOUGHTON.